US008857257B2

(12) United States Patent
Sears et al.

(10) Patent No.: US 8,857,257 B2
(45) Date of Patent: Oct. 14, 2014

(54) VIBRATING ELEMENT APPARATUS (75) Inventors: Jeffery Allan Sears, Berkshire (GB);
Tadewos Tzegazeab, Berkshire (GB)

(73) Assignee: Mobrey Limited, Berkshire (GB)

( * ) Notice: Subject to any disclaimer, the term of this patent is extended or adjusted under 35 U.S.C. 154(b) by 104 days.

(21) Appl. No.: 13/128,944

(22) PCT Filed: Nov. 12, 2009

(86) PCT No.: PCT/IB2009/007565
§ 371 (c)(1),
(2), (4) Date: May 12, 2011

(87) PCT Pub. No.: WO2010/055415
PCT Pub. Date: May 20, 2010

(65) Prior Publication Data
US 2011/0226054 A1    Sep. 22, 2011

(30) Foreign Application Priority Data
Nov. 14, 2008  (GB) .................................. 0820853.0

(51) Int. Cl.
*G01F 23/00* (2006.01)
*G01F 23/296* (2006.01)
*G01F 25/00* (2006.01)

(52) U.S. Cl.
CPC ................. *G01F 23/2966* (2013.01);
*G01F 25/0061* (2013.01)
USPC ....................................................... 73/290 V

(58) Field of Classification Search
CPC . G01F 23/2967; G01F 23/2966; G01F 23/00; G01F 23/0007; G01F 23/28; G01F 23/282; G01F 23/296; G01F 23/2961; G01F 23/2968; G01F 17/00; B41J 2/17566; B41J 2002/17583; B41J 2/17553; G01N 2291/02836
USPC ............ 73/290 V, 54.41, 61.45, 61.49, 61.75, 73/61.79, 64.53
See application file for complete search history.

(56) References Cited

U.S. PATENT DOCUMENTS

| 4,329,875 A | 5/1982 | Nolting et al. ................... 73/290 |
| 5,627,310 A | 5/1997 | Johnson ........................ 73/64.53 |
| 5,895,848 A * | 4/1999 | Wilson et al. ............... 73/290 V |

(Continued)

FOREIGN PATENT DOCUMENTS

| DE | 2144770 | 3/1973 |
| DE | 33 04 223 A1 | 8/1984 |
| DE | 102006007199 | 8/2007 |
| EP | 1624291 | 2/2006 |

OTHER PUBLICATIONS

Chinese Office Action from corresponding Chinese Application No. CN200980150369.8, dated Jul. 10, 2012.

(Continued)

*Primary Examiner* — Daniel S Larkin
*Assistant Examiner* — Jamar Ray
(74) *Attorney, Agent, or Firm* — Westman, Champlin & Koehler, P.A.

(57) ABSTRACT

The invention provides a method of, and means for detection the condition of the fork of a vibrating fork level sensor. Changes in the normal operating frequency are compared with previous measurements and an alert generated if the change becomes significant. The method is preferably used to detect significant levels of coating build-up on the fork.

15 Claims, 5 Drawing Sheets

(56) References Cited

U.S. PATENT DOCUMENTS

| | | | | |
|---|---|---|---|---|
| 5,969,235 | A | 10/1999 | Allan | 73/61.62 |
| 6,389,891 | B1* | 5/2002 | D'Angelico et al. | 73/290 V |
| 2002/0144550 | A1* | 10/2002 | Nishihara | 73/651 |
| 2005/0140522 | A1* | 6/2005 | Heilig et al. | 340/870.01 |
| 2006/0260385 | A1* | 11/2006 | Galun et al. | 73/24.04 |
| 2007/0186646 | A1* | 8/2007 | Frick et al. | 73/290 V |
| 2008/0173088 | A1* | 7/2008 | Quill | 73/323 |

OTHER PUBLICATIONS

Translation of Chinese Office Action from corresponding Chinese Application No. CN200980150369.8, dated Jul. 10, 2012.

International Search Report for PCT/IB2009/007565 filed Nov. 12, 2009; 3 pages.

Search Report from corresponding Application No. GB0820853.0, dated Feb. 19, 2011, 1 page.

* cited by examiner

FIGURE 5

VIBRATING ELEMENT APPARATUS

CROSS-REFERENCE TO RELATED APPLICATION

This Application is a Section 371 National Stage Application of International Application No. PCT/IB2009/007565, filed 12 Nov. 2009 and published as WO 2010/055415 on 20May 2010, in English, the contents of which are hereby incorporated by reference in their entirety.

FIELD OF THE INVENTION

This invention relates to vibrating element apparatus and, more particularly, to such apparatus when provided in the form of a vibrating fork level sensor.

BACKGROUND TO THE INVENTION

The principle of a vibrating fork level sensor is simple. A tuning fork is caused to vibrate at its natural frequency by a piezoelectric crystal assembly and associated electronic circuit. As is well known, the natural frequency changes when the fork is immersed in liquid. Depending on how the sensor is configured, a change in the natural frequency beyond a threshold serves as an indication that the fork assembly is either become immersed in a fluid or, having been immersed in a fluid, is now no longer immersed.

Instruments of this type are typically calibrated when the fork assembly is dry. Once the dry frequency has been determined, the thresholds at which the instrument is assumed to be wet, or is faulty, can be established with reference to the resonant frequency, and stored in the operating electronics. When in service, if the fork assembly is dry, the operating frequency is compared with a low threshold. If the frequency falls below that threshold, the fork assembly is assumed to be wet. If the instrument is wet, the operating frequency is compared with a different, upper, threshold and, when this threshold is exceeded, the fork assembly is assumed to be dry.

It is recognized that the calibration frequency can change due to changes in the condition of the fork assembly. For example, the fork assembly can acquire a coating which increases the mass of the fork assembly and reduces its resonant frequency. The fork assembly can also suffer from corrosion. In this event, the mass of the fork assembly decreases and the resonant frequency increases.

These alterations in the fork assembly can reach a point at which false indications of wet or dry can be given.

It is an object of the invention to provide a form of vibrating element apparatus which will address the problems set forth above; or which will at least provide a novel and useful alternative.

SUMMARY OF THE INVENTION

In one aspect the invention provides a method of operating a vibrating element apparatus which, in use, is subject to contact and removal of contact with a fluid, said method including the steps of:
causing a vibrating element to vibrate at an operating frequency during normal operation; and
observing a change in said operating frequency in response to a change of environment in contact with said vibrating element, said method being characterized in that it includes:
periodically storing measurements of said operating frequency during normal operation; and monitoring any change in said operating frequency.

Preferably measurements of said operating frequency are observed and stored when said vibrating element is dry.

Alternatively measurements of said operating frequency are observed and stored when said vibrating element is wet.

Preferably said method further includes extrapolating from stored measurements of said operating frequency to establish a predicted time at which the apparatus is predicted to provide a false indication of wet or dry; and generating an alert at a time in advance of said predicted time.

Alternatively said method further includes generating an alert if a measurement of said operating frequency differs from an earlier measurement of said operating frequency by a predetermined amount.

Preferably said method further includes delaying a measurement of operating frequency for a time period following a change of environment in contact with said vibrating element.

Preferably said method further includes correcting said frequency measurements having regard to changes in operating temperature before performing the method based on such frequency measurements.

Preferably said method further includes transmitting said alert(s) to a remote location.

In a second aspect the invention provides a vibrating element apparatus which, in use, is subject to contact and removal of contact with a fluid, said apparatus including a vibrating element which vibrates at a set operating frequency during normal operation; and
a processing facility operable to monitor a change in said frequency in response to a change of environment in contact with said vibrating element, said apparatus being characterized in that:
said processing facility is further operable to periodically store measurements of said operating frequency during normal operation; and monitor any change in said operating frequency.

Preferably said processing facility is further operable to extrapolate the stored measurements of said operating frequency to establish a predicted time at which the apparatus is predicted to provide a false indication of wet or dry; and to generate an alert in advance of said predicted time.

Alternatively said processing facility is further operable to generate an alert if a measurement of said operating frequency differs from an earlier measurement of said operating frequency by a predetermined amount.

Preferably said processing facility is further operable to delay a measurement of operating frequency for a time period following a change of environment in contact with said vibrating element.

Preferably said processing facility is further operable to correct frequency measurements having regard to changes in operating temperature before performing a method based on such frequency readings.

Preferably said apparatus further includes a communications facility operable to communicate said alert(s) to a remote location.

Many variations in the way the present invention can be performed will present themselves to those skilled in the art. The description which follows is intended as an illustration only of one means of performing the invention and the lack of description of variants or equivalents should not be regarded as limiting. Wherever possible, a description of a specific element should be deemed to include any and all equivalents thereof whether in existence now or in the future.

BRIEF DESCRIPTION OF THE DRAWINGS

A working embodiment of vibrating element apparatus embodying the invention will now be described with reference to the accompanying drawings in which.

DETAILED DESCRIPTION OF WORKING EMBODIMENT

Figure 1:
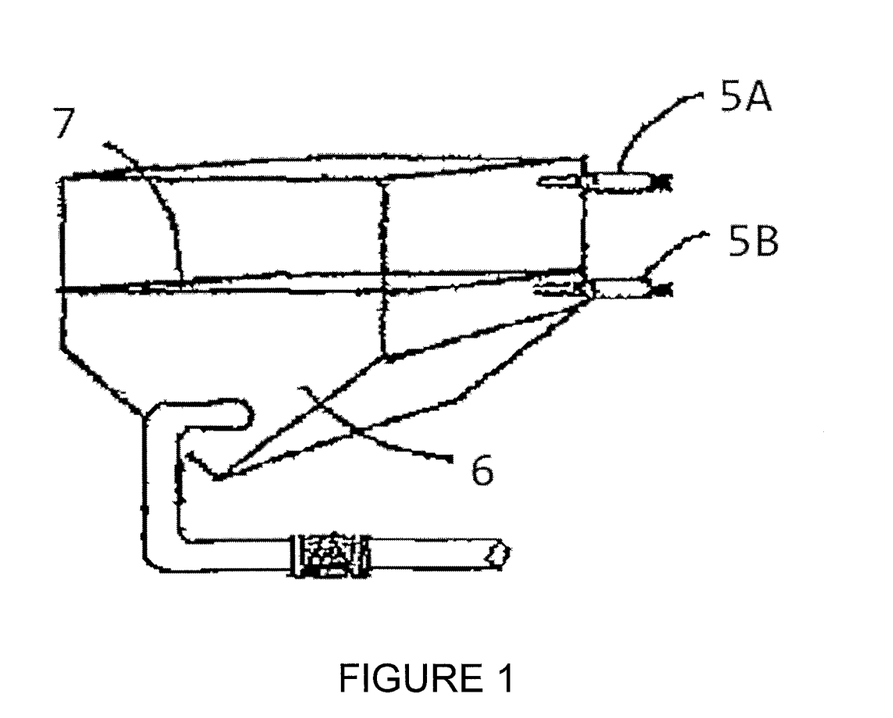
FIG. 1: shows a general tank installation in which the level of the tank contents are monitored by apparatus according to the invention.

The present invention provides a vibrating element apparatus preferably in the form of a tuning fork level sensor 5. As is well known, sensors 5 are mounted to provide a response to fluid levels reaching particular limits. Referring to FIG. 1, a first sensor 5A may be mounted on tank 6 to respond when the fluid level 7 reaches a maximum level, whilst sensor 5B is mounted to respond when the fluid level reaches a minimum level.

In the particular case illustrated, the sensor 5A is preferably configured so that, in normal operation, the fork is uncovered. As the fork becomes immersed by the rising fluid level, the operating frequency is reduced. When the reduction in frequency falls below a threshold, this is sensed by the internal electronics of the sensor and an indication generated that the fork is wet. The change in status could also, for example, initiate a command to switch off a pump supplying fluid to the tank 6.

The sensor 5B will typically operate in the reverse manner to sensor 5A since, in normal operation, the sensor is immersed in the fluid. As the level of fluid falls below the fork of sensor 5B the operating frequency increases. When the increase exceeds another threshold, this is sensed by the internal electronics of the sensor and an indication generated that the fork is dry. The change of status to dry could, for example, also initiate a command to switch off a pump withdrawing fluid from the tank 6.

Often, the natural operating frequency of the apparatus varies with time. The causes may be many and varied but the most common arises from the fork assembly acquiring a coating. In the case of a sensor which is normally dry, e.g. sensor 5A, the acquisition of a coating will add mass to the fork assembly and cause the operating frequency to be reduced. If the coating builds over time, the situation may be reached where the apparatus falsely indicates that the fork assembly is wet through a rising fluid level when, in reality, the fork assembly is still dry.

A similar effect could arise if the fork assembly, being normally immersed such as that of sensor 5B, suffers from corrosion. In this event the mass of the fork assembly will decrease and the operating frequency will rise. This may progress over time until the apparatus indicates dry when, in reality, the fork assembly is still wet.

Expressed most simply, the invention addresses the above problems by monitoring the natural operating frequency over time, and making decisions or predictions about fork deterioration as the measured frequency differs from the original calibration frequency.

Figure 2:
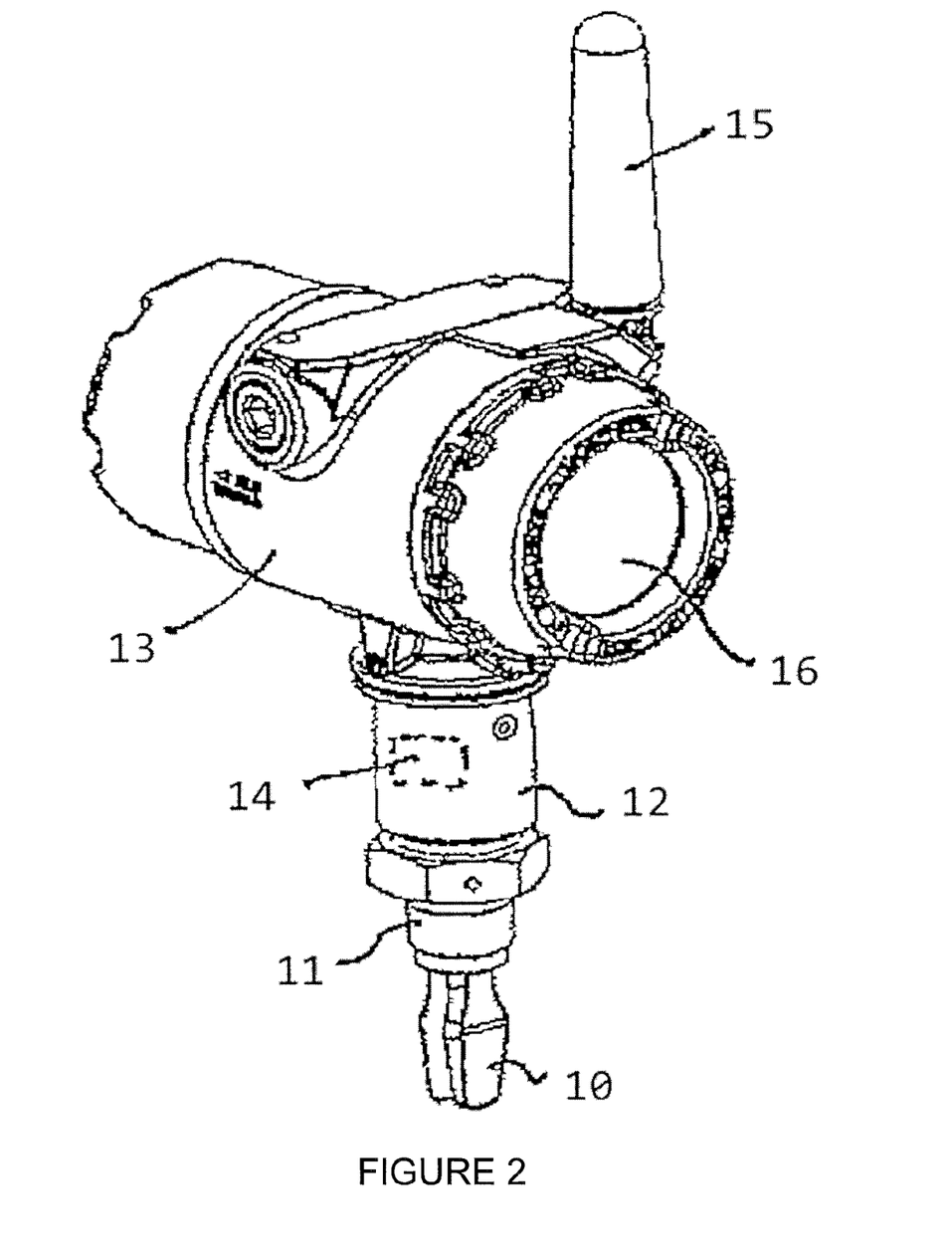
FIG. 2: shows an enlarged isometric view of apparatus embodying the invention.

Referring now to FIG. 2, a tuning fork level sensor embodying the invention comprises a fork assembly 10 projecting from a body 11. Contained within the body 11 is a piezo electric crystal assembly of the known type which, when subjected to an oscillating electric potential causes the fork assembly 10 to vibrate. The body 11 is connected to a housing 13 by a threaded adapter 12. Contained within the threaded adapter 12, and indicated schematically in dotted outline by 14, is the driver electronics for the piezo electric assembly. A further electronics package (not shown) is located within the housing 13. This further electronics package determines and responds to frequency changes and, in turn, provides an indication of whether the fork assembly is wet or dry. In the known manner the further electronics package includes an electronic memory and a processor.

The housing 13 may also contain one or more batteries to power the sensor and may also include a communications facility, including an antenna 15, whereby the status of the fork assembly (wet or dry) can be communicated to a remote location, The status of the fork assembly may also be indicated on a visual display 16.

Figure 3:
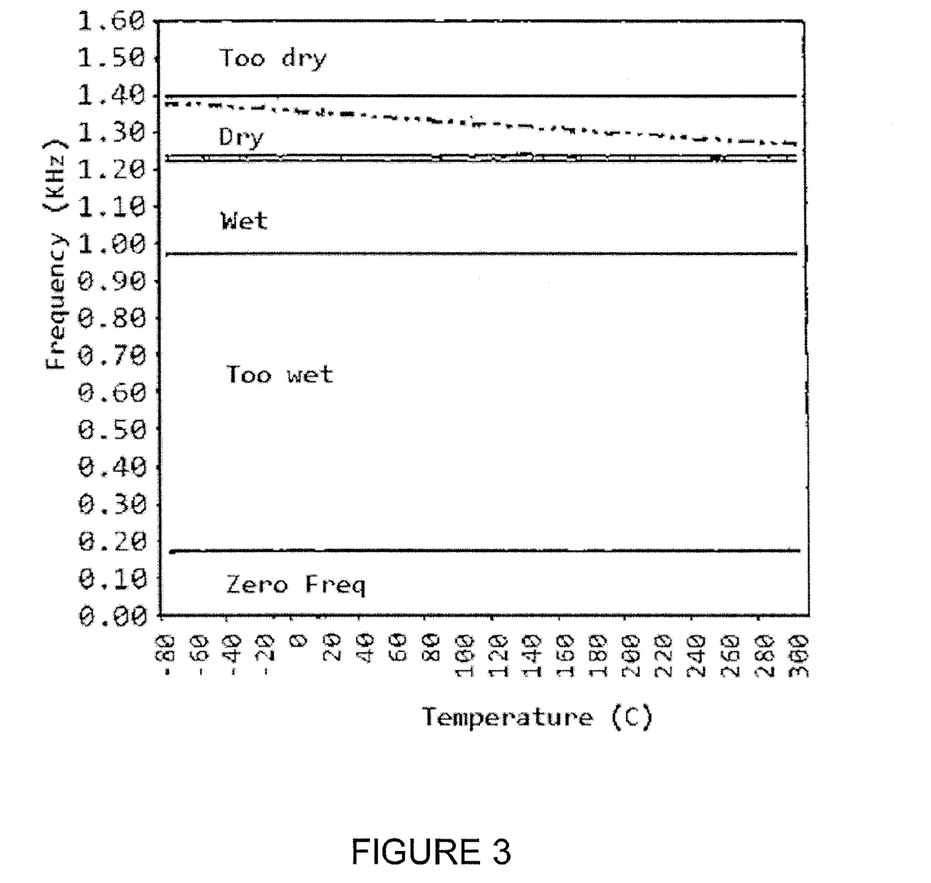
FIG. 3: shows a diagram illustrating typical frequency switching bands for apparatus of the type shown in FIG. 2.

Referring now to FIG. 3, the sensor 5 is typically configured or programmed to have a range of thresholds which define the operation of the sensor. These thresholds are preferably related to the initial calibration frequency which is established at the time of manufacture.

For the purposes of illustration, in the example given herein, the sensor is calibrated at a temperature of 20° C., at which temperature the natural operating frequency is 1350 Hz. This is known as the calibrated dry frequency ('CDF').

The thresholds illustrated in FIG. 3 are then established by the electronics package in fixed relationship to the CDF.

For a sensor which is dry a frequency reading above (in this case) 1400 Hz is an indication of 'Too Dry' and will generally be interpreted as indicating a fault. A frequency measurement of between about 1240 Hz and 1400 Hz indicates normal dry operation. As the fork assembly 10 becomes immersed in fluid the resonant frequency falls and a 'wet' indication is given at about 1220 Hz. As illustrated there is a preferably a 20 Hz band between wet and dry to provide hysteresis.

If the sensor is wet and the frequency falls below about 180 Hz, it is assumed that the fork assembly is in contact with a highly viscous liquid. Frequency readings between 180 Hz and 980 Hz are indications that the fork assembly is too wet and that a fault is present.

Figure 4:
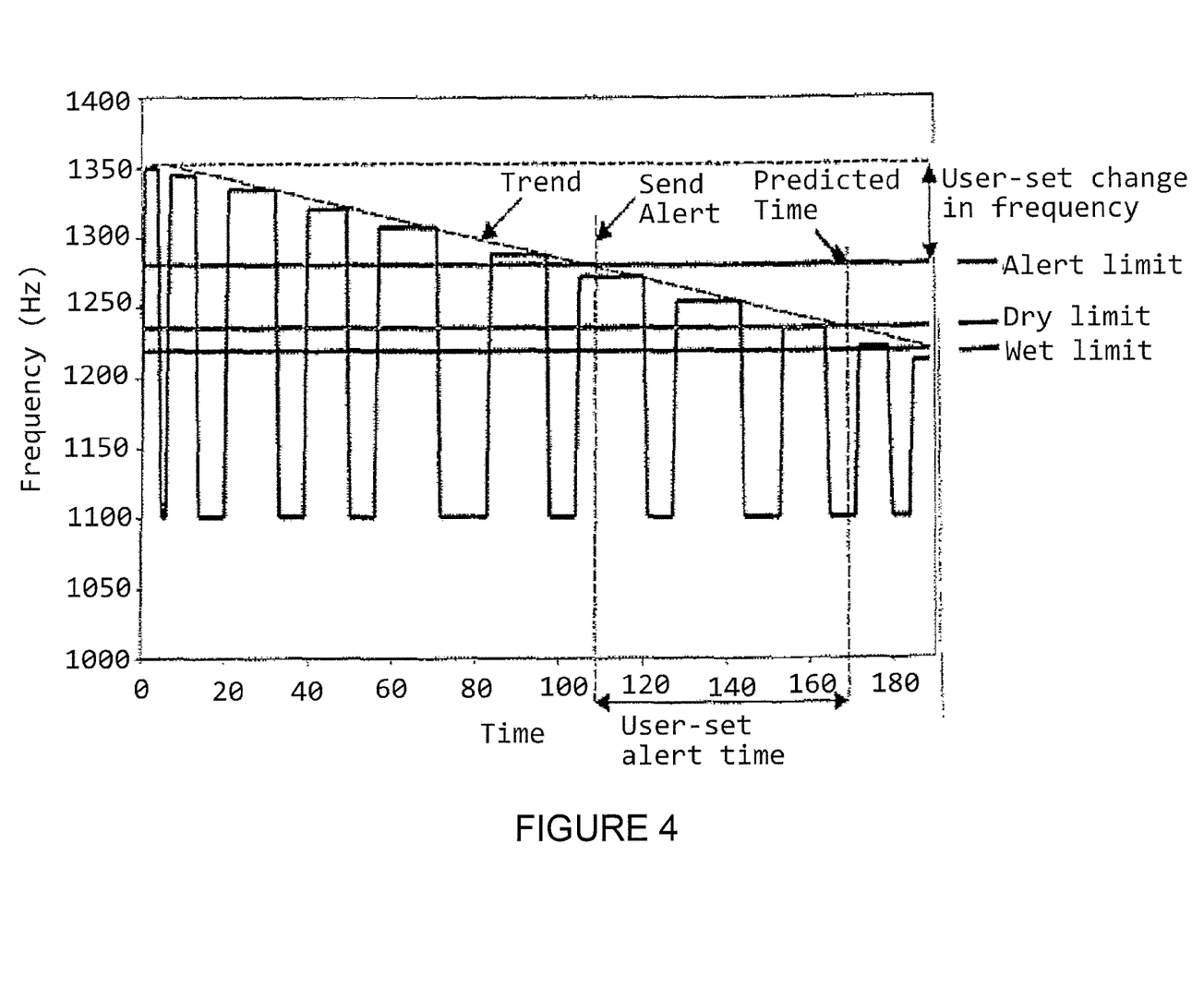
FIG. 4: is a diagram showing the effect of vibrating fork sensor coating, on resonant frequency, over time.

Referring now to FIG. 4, the waveform plot shows the behavior of the dry operating frequency over time. Over time, due to coating build-up on the forks, the natural operating frequency falls, in the example shown, from the CDF of 1350 Hz.

The invention involves measuring and storing in memory the natural dry operating frequency. As the dry operating frequency declines over time due to coating on the fork assembly, the decline is observed and an alert generated in advance of the point at which the instrument will falsely indicate that the forks are wet when, in fact, they remain dry.

In the simplest form of the invention, an alert is generated when the dry operating frequency has shifted by more than a defined limit. In a more sophisticated embodiment of the invention, the rate of decline of the dry operating frequency is observed and extrapolated to establish a predicted time at which the dry operating frequency will have declined to the extent that it equals the frequency at which the forks are assumed to be wet ('the Dry Limit'). An alert is then generated at a defined time in advance of the predicted time so that remedial action can be taken before the instrument is in a state where is fails to give an accurate indication.

Referring now to FIG. 4, the waveform indicates the decline in dry operating frequency, with time, from a CDF of 1350 Hz. The upper horizontal line, at about 1280 Hz is the Alert Limit. In one embodiment of the invention, an alert is generated in the event the dry operating frequency falls below the Alert Limit.

As indicated in FIG. 4, the position of the Alert Limit, relative to the CDF, may be established or adjusted by a user by adjustment of the further electronics package.

The more sophisticated embodiment of the invention is also indicated in FIG. 4. In this embodiment the decline in the dry operating frequency is not only observed, but also extrapolated, as shown by the dotted Trend line. The point at which the Trend line intersects with the Dry Limit establishes a predicted time at which the sensor will fail to provide an accurate indication of 'wet'. To enable remedial action to be taken before failure actually arises, the sensor is programmed to send an alert ('Send Alert') somewhat in advance of the predicted time.

The Send Alert timing can, if employed, also be user-adjustable and may, for example, be set to a time, say, three months in advance of the Predicted Time.

Regardless of the technique employed to generate an alert, in order to avoid spurious readings, a time delay is applied, after the apparatus undergoes a change from wet, before a dry reading is stored. This is to allow fluid to drain from the surface of the fork assembly 10 and thus ensure that any change in frequency is due to a permanent change in the fork assembly e.g. due to a coating build-up.

Figure 5:
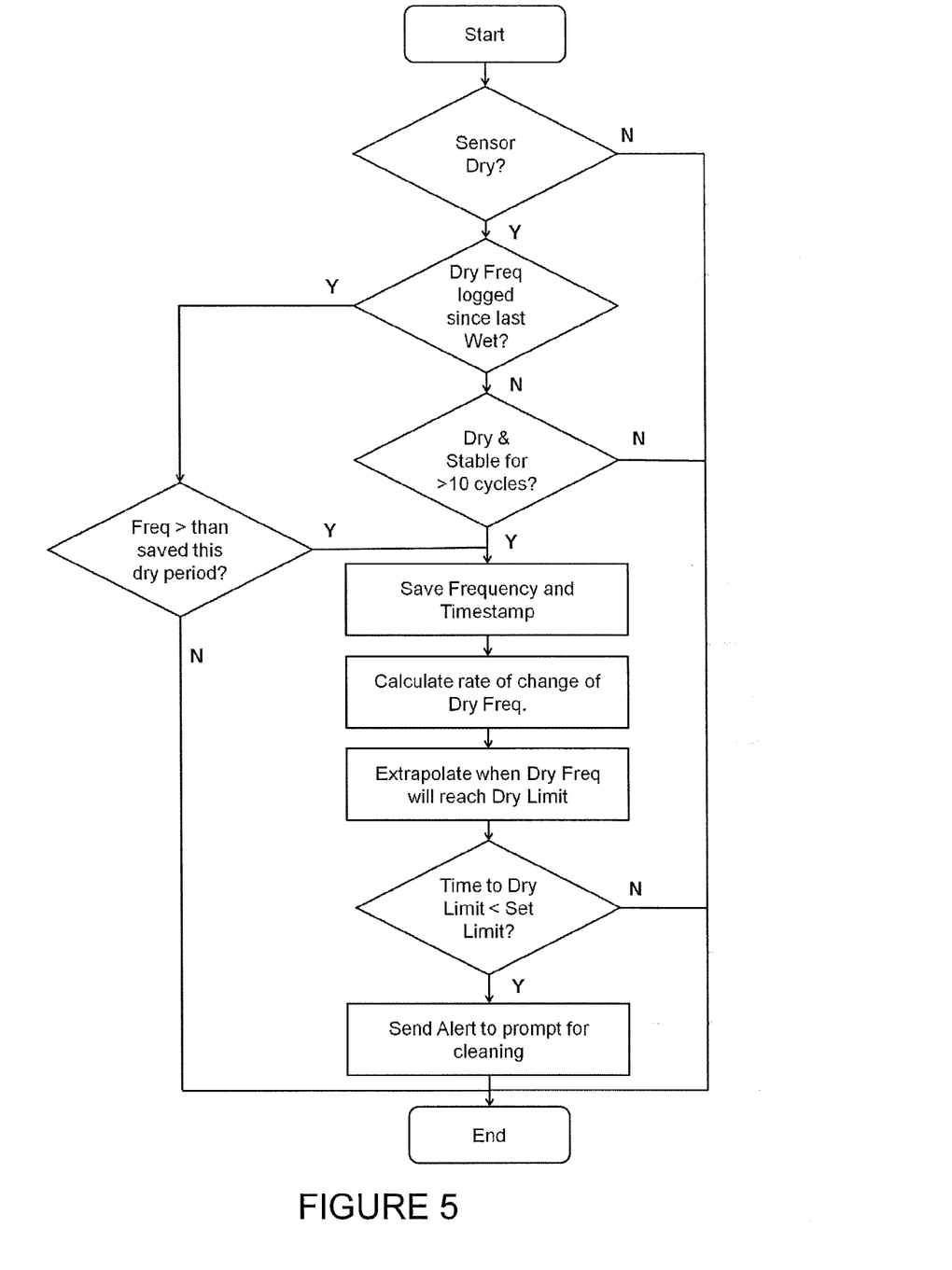
FIG. 5: shows a flowchart of a typical application of the invention.

Referring now to FIG. 5, the flow chart shows a typical sequence followed by the electronics in the more sophisticated version of the invention. In this particular example, the fork assembly must be dry for ten measurement cycles before the operating frequency is measured and, if less than that previously stored, stored. From the succession of stored readings, the Trend line shown in FIG. 4 can be established. The Send Alert time is set, arbitrarily, in advance of the time at which the extrapolation indicates that the Dry frequency will intersect the Dry Limit frequency.

The examples shown in FIGS. 4 and 5 apply to a sensor which is normally dry and is susceptible to coating build-up. It will be appreciated that exactly the same principle may be applied to a sensor which is normally dry and susceptible to corrosion; and to a sensor which is normally wet and susceptible to either coating or corrosion. Whatever the case, operating frequencies are observed and analysed in the manner described above. If fork coating is in issue, then decreases in operating frequency are observed and analysed. If fork corrosion is in issue, then increases in operating frequency are observed and analysed.

In the example described above, the analysis of the dry operating frequency is undertaken within the instrument. It will be appreciated, by those skilled in the art, that the analysis could also be undertaken at a remote site using frequency measurements communicated using the communications facility embodied in the apparatus described.

It will be further appreciated that, to improve accuracy, frequency readings can be corrected for changes in operating temperature before the method as above described, is performed.

It will thus be appreciated that the present invention, at least in the case of the embodiment described, provides a method of, and means for, adding to the capability of a forked level sensor and, in particular, extends the opportunity for avoiding misinformation in the field arising from contact of the fork assembly with process fluids.

The invention claimed is:

1. A method of operating a vibrating element apparatus which, in use, is subject to contact and removal of contact with a fluid, said method comprising steps of: causing a vibrating element to vibrate at an operating frequency during normal operation; and observing a change in said operating frequency in response to said vibrating element changing from being dry to wet or from being wet to dry; indicating that the vibrating element is wet or dry based on the change in said operating frequency; storing over time measurements of said operating frequency measured during normal operation to capture changes in said measurements, all of the stored measurements being taken while the vibrating element is dry or, alternatively, while the vibrating element is wet; delaying a measurement of said operating frequency for a time period following a change of said vibrating element from being wet to being dry, or from being dry to being wet; monitoring changes in said stored measurements; and generating an alert if a stored measurement differs from an earlier stored measurement by a predetermined amount; wherein the alert signifies that the indicating step falsely indicates, or will falsely indicate, that the vibrating element is wet or dry.

2. A method as claimed in claim 1, wherein storing over time measurements of said operating frequency occurs when said vibrating element is dry.

3. A method as claimed in claim 1, wherein storing over time measurements of said operating frequency occurs when said vibrating element is wet.

4. A method as claimed in claim 1 further including correcting operating frequency measurements having regard to operating temperature before observing a change in said operating frequency.

5. A method as claimed in claim 1 further including transmitting said alert to a remote location.

6. A vibrating element apparatus which, in use, is subject to contact and removal of contact with a fluid, said apparatus comprising: a vibrating element which vibrates at a set operating frequency during normal operation; and a processing facility operable to: monitor a change in said operating frequency in response to said vibrating element changing from being dry to being wet or from being wet to being dry; indicate that the vibrating element is wet or dry based on the change in said operating frequency; store over time measurements of said operating frequency measured during normal operation to capture changes in said stored measurements, all of the stored measurements being taken while the vibrating element is dry or, alternatively, while the vibrating element is wet; monitor changes in said stored measurements; and generate an alert if a stored measurement differs from an earlier stored measurement by a predetermined amount; wherein: said processing facility delays a measurement of said operating frequency for a time period following a change of said vibrating element from being wet to being dry or from being dry to being wet; and the alert signifies that the processing facility has falsely indicated, or will falsely indicate, that the vibrating element is wet or dry.

7. Apparatus as claimed in claim 6, wherein said processing facility is further operable to correct operating measurements having regard to changes to operating temperature before performing a method based on such frequency readings.

8. Apparatus as claimed in claim 6 further including a communications facility operable to communicate said alert to a remote location.

9. Apparatus as claimed in claim 6, wherein said processing facility is further operable to transmit said alert to a remote location.

10. A method of operating a vibrating element apparatus which, in use, is subject to contact and removal of contact with a fluid, said method comprising steps of: causing a vibrating element to vibrate at an operating frequency during normal operation; observing a change in said operating frequency in response to said vibrating element changing from being dry to being wet or from being wet to being dry; indicating that the vibrating element is wet or dry based on the change in said operating frequency; periodically storing over time and during normal operation measurements of said operating frequency to capture changes in said measurements, all of the stored measurements being taken while the vibrating element is wet or, alternatively, while the vibrating element is dry; delaying a measurement of said operating frequency for a time period following a change of said vibrating element from being wet to being dry, or from being dry to being wet; extrapolating from said stored measurements to establish a predicted time at which the operating frequency will be such that the apparatus provides a false indication of the vibrating element being wet or being dry; and generating an alert in advance of said predicted time; wherein the alert signifies that the indicating step will falsely indicate that the vibrating element is wet or dry.

11. A method as claimed in claim 10, further including correcting operating frequency measurements having regard to operating temperature before observing of a change in said operating frequency.

12. A method as claimed in claim 10 further including transmitting said alert to a remote location.

13. A vibrating element apparatus which, in use, is subject to contact and removal of contact with a fluid, said apparatus comprising: a vibrating element which vibrates at a set operating frequency during normal operation; and a process facility operable to: monitor a change in said operating frequency in response to said vibrating element changing from being dry to being wet or from being wet to being dry; indicate that the vibrating element is wet or dry based on the change in said operating frequency; store over time and during normal operation measurements of said operating frequency, all of the stored measurements being taken while the vibrating element is dry, or alternatively, while the vibrating element is wet; extrapolate the stored measurements of said operating frequency to establish a predicted time at which the operating frequency is such that the apparatus will provide a false indication of the vibrating element being wet or being dry; and generate an alert in advance of said predicted time; wherein: said processing facility delays a measurement of said operating frequency for a time period following a change of said vibrating element from being wet to being dry or from being dry to being wet; and the alert signifies that the processing facility will falsely indicate that the vibrating element is wet or dry.

14. Apparatus as claimed in claim 13 further including a communications facility operable to communicate said alert to a remote location.

15. Apparatus as claimed in claim 13, wherein said processing facility is further operable to correct operating frequency measurements having regard to changes in operating temperature before performing a method based on such frequency readings.

* * * * *